United States Patent [19]

Cullen et al.

[11] Patent Number: 5,036,972
[45] Date of Patent: Aug. 6, 1991

[54] ADSORBENT PACKET WITH INTEGRAL HEAT SHIELD AND METHOD OF FABRICATION THEREOF

[75] Inventors: John S. Cullen, Buffalo; Samuel A. Incorvia, Tonawanda, both of N.Y.

[73] Assignee: Multiform Desiccants, Inc., Buffalo, N.Y.

[21] Appl. No.: 514,220

[22] Filed: Apr. 25, 1990

[51] Int. Cl.$^5$ .......................................... B01D 53/04
[52] U.S. Cl. .............................. 206/204; 206/484.2; 55/387; 62/503; 210/282; 210/DIG. 6
[58] Field of Search .......... 206/204, 439, 484, 484.1, 206/484.2, 524.2; 55/387, 389, 482, 490, 493; 210/282, 232, DIG. 6; 62/503

[56] References Cited

U.S. PATENT DOCUMENTS

| | | | |
|---|---|---|---|
| 3,734,296 | 5/1973 | Proctor et al. | 210/288 |
| 3,990,872 | 11/1976 | Cullen | 210/DIG. 6 X |
| 4,111,005 | 9/1978 | Livesay | 62/503 |
| 4,116,649 | 9/1978 | Cullen et al. | 55/387 |
| 4,187,695 | 2/1980 | Schumacher | 62/503 |
| 4,199,960 | 4/1980 | Adams | 62/503 |
| 4,270,934 | 6/1981 | Widdowson et al. | 55/316 |
| 4,276,756 | 7/1981 | Livesay | 62/503 |
| 4,291,548 | 9/1981 | Livesay | 62/503 |
| 4,401,447 | 8/1983 | Huber | 55/387 |
| 4,405,347 | 9/1983 | Cullen et al. | 55/387 |
| 4,436,623 | 3/1984 | Cullen et al. | 210/DIG. 6 X |
| 4,457,843 | 7/1984 | Cullen et al. | 210/282 |
| 4,464,261 | 7/1984 | Cullen et al. | 210/282 |
| 4,474,035 | 10/1984 | Amin et al. | 62/503 |
| 4,496,378 | 1/1985 | Kish | 55/316 |
| 4,619,673 | 10/1986 | Cullen et al. | 55/387 |
| 4,748,069 | 5/1988 | Cullen | 206/204 X |
| 4,911,739 | 3/1990 | Cullen et al. | 55/387 |
| 4,994,185 | 2/1991 | Cullen et al. | 55/387 X |

Primary Examiner—Paul T. Sewell
Assistant Examiner—Jacob K. Ackun, Jr.
Attorney, Agent, or Firm—Joseph P. Gastel

[57] ABSTRACT

An adsorbent packet including a casing of permeable material, adsorbent in the casing, and a sleeve of metal foil fused to a central portion of the casing by ultrasonic welding and having a layer of nylon on the outside thereof. A method of fabricating an adsorbent packet including the steps of superimposing a first sheet of permeable material over a first sheet of metal foil, superimposing a second sheet of metal foil over a second sheet of permeable material, forming the first sheets into a pocket with the metal foil on the outer surface of the central portion thereof, filling the pocket with adsorbent, superimposing the second sheet of permeable material and the second sheet of metal foil over the pocket with the second sheet of metal foil on the outside thereof and in line with the first sheet of metal foil, sealing edge portions of all of the first and second sheets to form a casing containing adsorbent with a metal foil sleeve on the outside thereof and with a seam extending completely around the casing, and triming the flash off of the material outside of the seam.

6 Claims, 3 Drawing Sheets

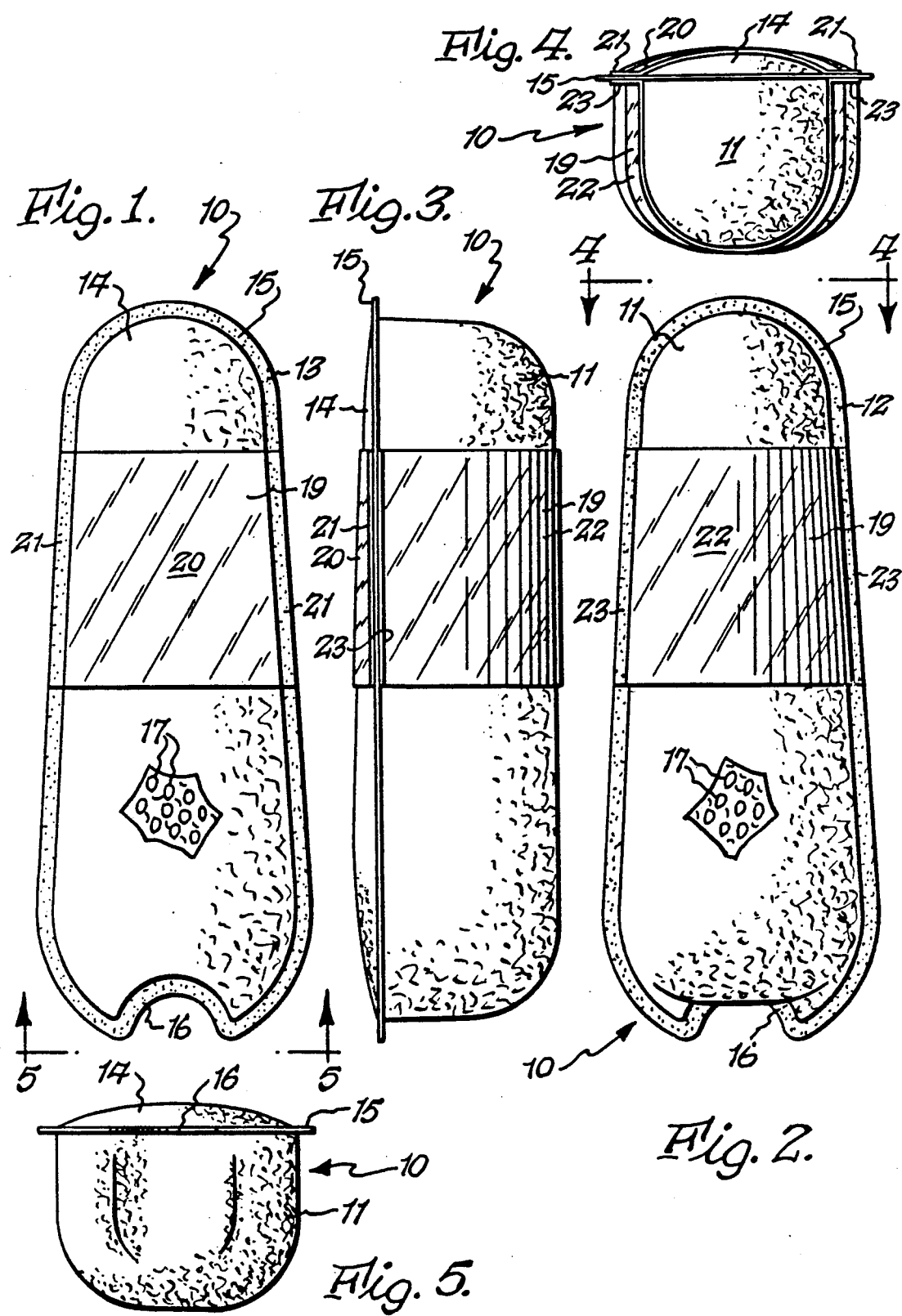

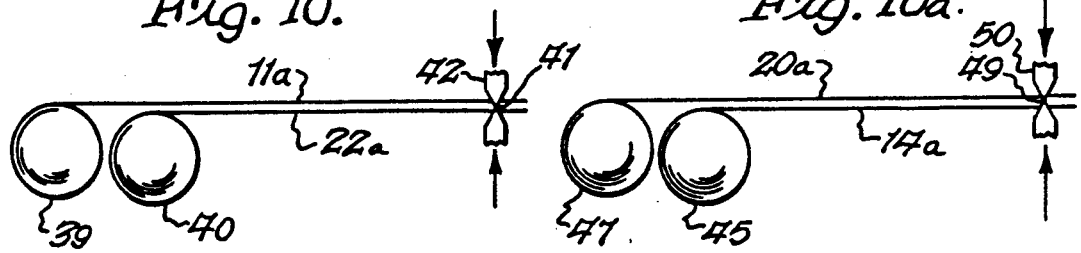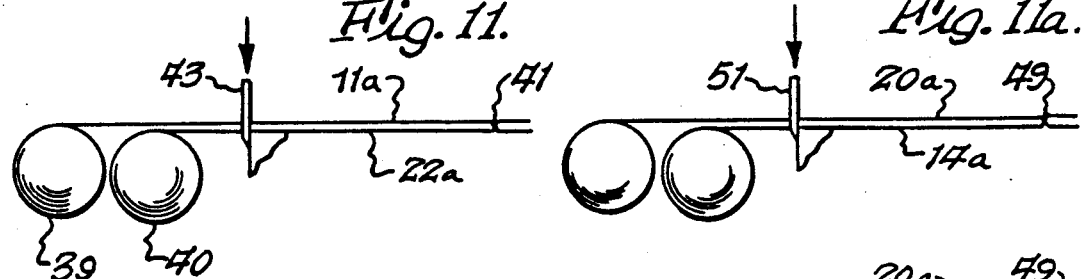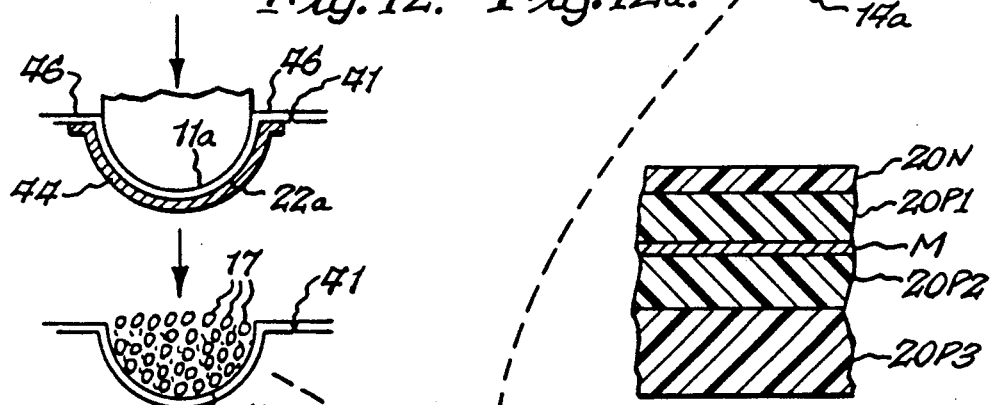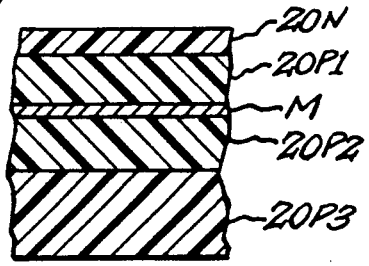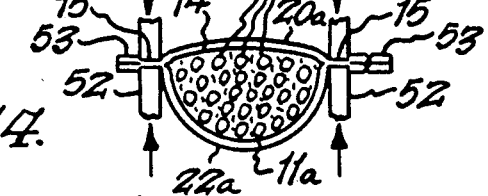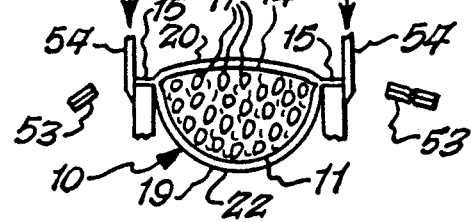

5,036,972

ADSORBENT PACKET WITH INTEGRAL HEAT SHIELD AND METHOD OF FABRICATION THEREOF

BACKGROUND OF THE INVENTION

The present invention relates to an adsorbent packet for use in refrigerant receivers.

By way of background, adsorbent packets are commonly placed in refrigerant receivers for the purpose of adsorbing impurities from the refrigerant. One common type of refrigerant receiver has a U-shaped conduit therein and the adsorbent packet is mounted on this conduit. The housing of the receiver is fabricated in two sections with a weld running circumferentially around the housing. The adsorbent packet is fabricated from heat-fusible fabric and must be protected from the welding heat. To this end, in the past, a metal foil sheet or sleeve was wound around both a central portion of the adsorbent packet and the V-shaped conduit on which it was mounted to reflect the welding heat from the fabric of the packet.

SUMMARY OF THE INVENTION

It is one object of the present invention to provide an improved adsorbent packet having a metal foil heat shield bonded to the central portion thereof for reflecting welding heat.

Another object of the present invention is to provide a method for fabricating an adsorbent packet having a sleeve of heat reflecting metal foil bonded to the central portion thereof. Other objects and attendant advantages of the present invention will readily be perceived hereafter.

The present invention relates to an adsorbent packet comprising a casing of permeable material, adsorbent in said casing, and a sleeve of metal foil laminate secured to a central portion of said casing, said sleeve of metal foil laminate having a layer of nylon on the opposite side thereof from said casing.

The present invention also relates to a method of fabricating an adsorbent packet comprising the steps of superimposing a first sheet of permeable material over a first sheet of metal foil of lesser size, superimposing a second sheet of metal foil over a second sheet of permeable material of greater size, forming said first sheet of permeable material into a pocket member with said first sheet of metal foil extending across a central portion of said pocket member and in contiguous relationship thereto, filling said pocket member with adsorbent, superimposing said second sheet of metal foil and said second sheet of permeable material over said pocket member with said second sheet of metal foil aligned with said first sheet of metal foil, and securing edges of said second sheet of metal foil and said second sheet of permeable material to said first sheet of said permeable material and said first sheet of metal foil.

The various aspects of the present invention will be more fully understood when the following portions of the specification are read in conjunction with the accompanying drawings wherein:

BRIEF DESCRIPTION OF THE DRAWINGS

FIG. 1 is a rear elevational view, partially broken away, of the adsorbent packet of the present invention;

FIG. 2 is a front elevational view, partially broken away, of the adsorbent packet;

FIG. 3 is a side elevational view of the adsorbent packet;

FIG. 4 is an end elevational view taken substantially in the direction of arrows 4—4 of FIG. 2;

FIG. 5 is an end elevational view taken substantially in the direction of arrows 5—5 of FIG. 1;

FIGS. 10, 11, 12 and 13 are schematic views showing the progressive steps in forming the pocket portion of the adsorbent packet and filling it with adsorbent;

FIGS. 10A, 11A and 12A show the progressive steps in forming the planar portion of the adsorbent packet;

FIG. 14 is a schematic view showing the pocket portion and the planar portion of the adsorbent packet being sealed to each other;

FIG. 15 is a schematic view showing the outer edge portions of the adsorbent packet being trimmed; and FIG. 16 is a fragmentary cross sectional view of the metal foil laminate of the sleeve.

DESCRIPTION OF THE PREFERRED EMBODIMENTS

Figure 6:
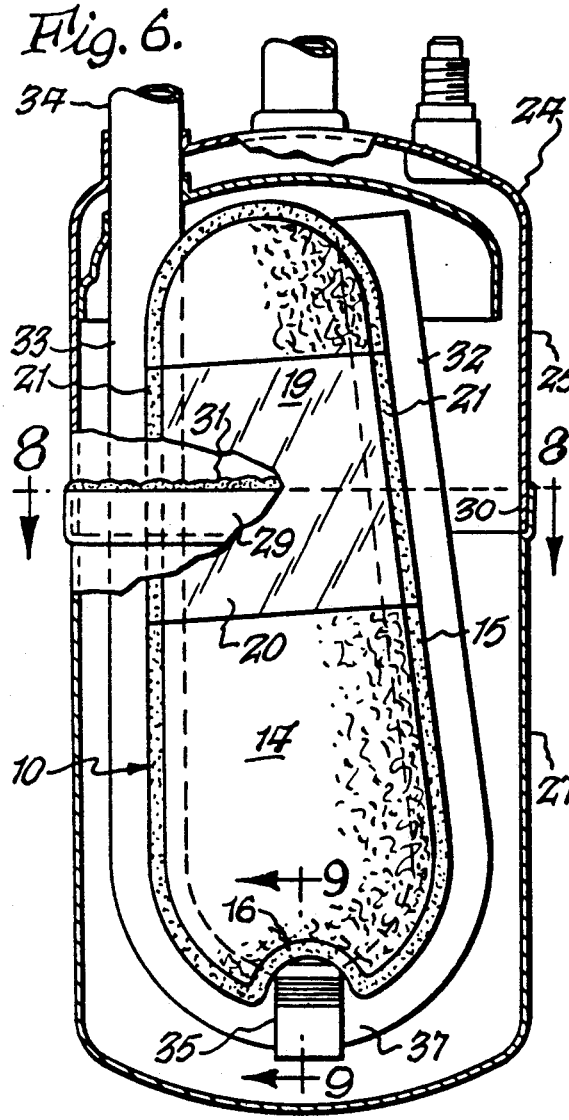
FIG. 6 is a fragmentary cross sectional view taken substantially along line 6—6 of FIG. 8 and showing the adsorbent packet of FIGS. 1-5 in position in a refrigerant receiver.

The improved adsorbent packet 10 of the present invention includes a casing having a pocket portion 11 with an outer edge portion 12 which is joined by suitable fusion to outer edge portion 13 of substantially planar portion 14 so as to form a continuous seam 15 which extends about the entire periphery of the packet. Seam 15 is of the configuration shown in FIGS. 1 and 4 and it has a recessed portion 16. The material of sections 11 and 14 is a polyester felt of the type disclosed in U.S. Pat. Nos. 4,401,447, issued Aug. 30, 1983, and 4,405,347, issued Sept. 20, 1983. This material will pass gases and liquids and portions 11 and 14 can be bonded to each other along seam 15 by the application of suitable heat and pressure, or in any other suitable manner, so as to fuse the material into a seam.

Adsorbent packet 10 is filled with a suitable adsorbent 17 which may be of any desirable composition and may selectively include, without limitation, adsorbents such as silica gel, metal alumino silicate, alumina, calcium sulfate, activated charcoal, molecular sieve, or any other desired compound, in bead, pellet or granular form.

A metal foil laminate heat shield 19 is formed in two portions. One sheet 20 of the laminate lies across the sheet which forms planar permeable portion 14, and it has opposite edges 21 which are sealed to seam 15. Heat shield 19 also includes a metal foil laminate sheet 22 which lies snugly across the sheet of permeable material which forms pocket 11 and has opposite edge portions 23 bonded to seam 15. By way of example and not of limitation, the sleeve 19 is a metal foil laminate product known under the trademark MARVELSEAL 360, and it has a layer of 60 gauge nylon film over a film of 18# low density polyethylene over 0.00035 aluminum foil over 18# low density polyethylene over a 2 mil low density polyethylene film. A cross section of the metal foil laminate is shown in FIG. 16 wherein the nylon layer is designated by the legend 20N, the low density polyethylene layer adjacent thereto is designated by the legend 20P1, the metal foil layer is designated by the letter M, the low density polyethylene layer on the opposite side of metal layer M is designated by the legend 20P2, and the outer polyethylene film layer is designated by the legend 20P3. The layers of material have the following thicknesses: 20N, 0.0006 inches; 20P1, 0.00125 inches; M, 0.00035 inches; 20P2, 0.00125 inches; and 20P3, 0.002 inches. The sheets 20 and 22 are oriented with their nylon layers N facing away from the contiguous fabric of casing portions 14 and 11, respectively, and the low density polyethylene layers 20P3 facing the fabric. In other words, the nylon layers N are on the outside of the sleeve 19. The layers 20P3 cause the outer edge portions 21 and 23 of sheets 20 and 22, respectively, to adhere to seam 15 because of the heat supplied during fabrication causes them to fuse to seam 15.

Figure 7:
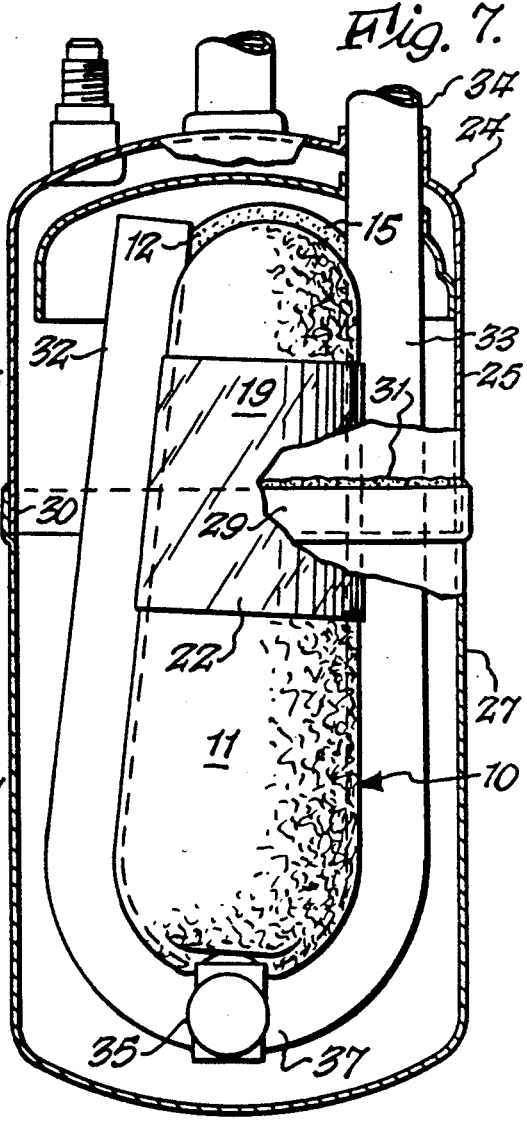
FIG. 7 is a fragmentary cross sectional view taken substantially along line 7—7 of FIG. 8 and also showing the adsorbent packet of the present invention in position in the refrigerant receiver.
Figure 8:
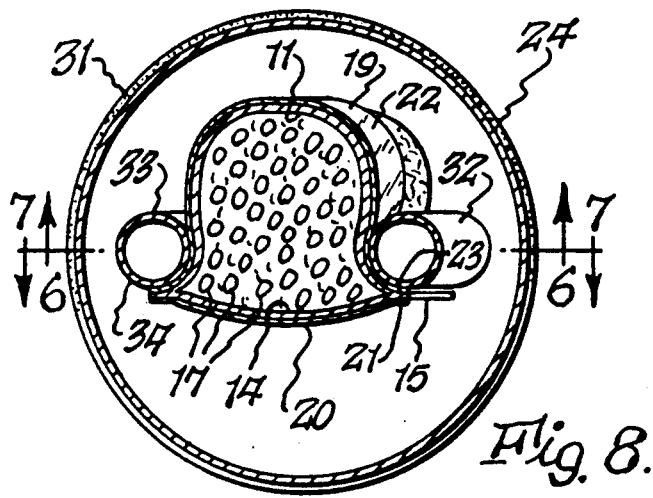
FIG. 8 is a cross sectional view taken substantially along line 8—8 of FIG. 6.
Figure 9:
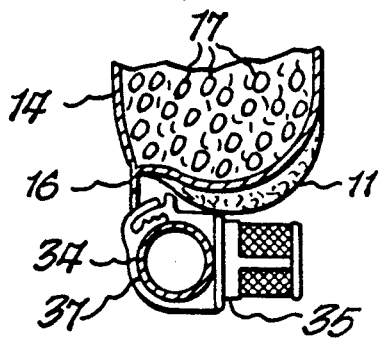
FIG. 9 is a fragmentary cross sectional view taken substantially along line 9—9 of FIG. 6.

In FIGS. 6-9, the adsorbent packet 10 is shown in installed position within refrigerant receiver 24 which consists of an upper metal housing portion 25 and a lower metal housing portion 27. The upper edge 29 of lower portion 27 is belled outwardly around its entire circumference to receive the lower edge portion 30 of upper receiver portion 25. A weld 31 extends circumferentially around the joint between edge portions 29 and 30.

Prior to the time that lower and upper sections 27 and 25 are welded to each other, adsorbent packet 10 is positioned within the legs 32 and 33 of U-shaped refrigerant conduit 34. As can be seen from FIGS. 6 and 8, seam 15 lies across one side of legs 32 and 33, and the pocket portion 11 of adsorbent packet 10 fits between legs 32 and 33. A filter 35 is mounted on return bend 37, and it is located underneath the recessed portion 16 of seam 15. Sleeve 19 is located abreast of weld 31, and it functions both to reflect heat away from the casing consisting of sections 11 and 14, and it also conducts any heat which it receives to the legs 32 and 33 with which it is in contact. In this respect, the nylon layers 20N of sheets 20 and 22 prevent the welding heat from completely penetrating metal layer M sufficiently, and thus they prevent the intense heat of welding from melting the permeable material of the casing. It is believed that the nylon layer works in two ways, namely, by insulating metal layer M and also reflecting welding heat away from layer M.

The method of fabricating the adsorbent packet 10 is disclosed in FIGS. 10-15 and FIGS. 10A-12A wherein the numerals with the suffix a correspond to structure of FIGS. 1-9 which have the same numerals without suffixes. The first step in the fabrication of adsorbent packet 10 is to withdraw permeable sheet material 11a from roll 39 and simultaneously withdraw metal foil sheet 22a from roll 40 and tack the two together at point 41 by sealing dies 42. The metal foil sheet 22a is oriented with the nylon layer facing away from the material 11a which is subsequently formed into pocket portion 11. The next step is to cut the section consisting of superimposed sheets 11a and 22a by means of a shear 43 to provide a piece of fixed length. The next step is to press the superimposed sheets 11a and 22a into a die 44 to form a pocket portion with outer edges 46 which are wider than the ultimate seam 15. Thereafter, the pocket portion of FIG. 12 is filled with adsorbent 17.

As a parallel operation shown in FIGS. 10A-12A, permeable sheet material 14a, which is subsequently formed into casing portion 14, is withdrawn from roll 45 and metal foil sheet 20a is withdrawn from roll 47 with its nylon surface facing upwardly away from sheet 14a, and the two are tacked at 49 by sealing dies 50. Thereafter, a piece to the left of tacked portion 49 is cut to length by cutting die 51 to provide a length of material.

The product of FIG. 12A is then superimposed over the product of FIG. 13, as shown in FIG. 14, and a seam 15 is formed entirely around the casing by dies 52 by ultrasonic welding which supplies sufficient heat and pressure to fuse the material into seam 15. Thereafter, the final step is shown in FIG. 15 wherein portions 53 outside of seam 15 are removed by trimming dies 54-54 to produce the completed adsorbent packet 11.

While preferred embodiments of the present invention have been disclosed, it will be appreciated that it is not limited thereto but may be otherwise embodied within the scope of the following claims.

What is claimed is:

1. An adsorbent packet comprising a casing of permeable material, adsorbent in said casing, and a sleeve of metal foil laminate secured to a central portion of said casing, said sleeve of metal foil laminate having a layer of nylon on the opposite side thereof from said casing.

2. An adsorbent packet as set forth in claim 1 wherein said permeable material is heat-fusible, and wherein said casing includes two portions bonded to each other by spaced seam portions, and wherein said sleeve comprises two portions each having two opposite ends secured to said spaced seam portions.

3. An adsorbent packet as set forth in claim 2 wherein said metal foil comprises a laminate comprising a layer of metal and a layer of heat-fusible plastic, and wherein said two portions of said sleeve are oriented with said layers of heat-fusible plastic facing said casing of permeable material, and wherein said heat-fusible plastic fuses said two sleeve portions to said spaced seam portions of said casing.

4. An adsorbent packet as set forth in claim 1 wherein said casing comprises a pocket member having first opposite edges and a substantially planar member having second opposite edges, a seam including spaced seam portions securing said first edges to said second edges, and wherein said sleeve comprises a first portion in contiguous relationship to said pocket member and a second portion in contiguous relationship to said substantially planar member, third opposite edges on said first portion of said sleeve, and fourth opposite edges on said second portion of said sleeve, said third and fourth opposite edges being secured to said casing at said spaced seam portions.

5. An adsorbent packet as set forth in claim 4 wherein said pocket member and said substantially planar member comprise heat-fusible material, and wherein said first edges are bonded to said second edges by fusion, and wherein said first and second portions of said sleeve comprise laminates of metal foil and heat-fusible plastic, and wherein said heat-fusible plastic of said first and second portions of said sleeve are oriented in facing relationship to said casing, and wherein said third and fourth opposite edges of said sleeve are bonded to said spaced seam portions by fusion of said heat-fusible plastic thereto.

6. An adsorbent packet as set forth in claim 5 wherein said bonding of said third and fourth opposite edges to said spaced seam portions is affected by ultrasonic welding.

* * * * *

UNITED STATES PATENT AND TRADEMARK OFFICE
CERTIFICATE OF CORRECTION

PATENT NO. : 5,036,972

DATED : August 6, 1991

INVENTOR(S) : John S. Cullen et al

It is certified that error appears in the above-identified patent and that said Letters Patent is hereby corrected as shown below:

Column 4, line 66 (claim 6), change "affected" to --effected--.

Signed and Sealed this

First Day of December, 1992

*Attest:*

DOUGLAS B. COMER

*Attesting Officer*   Acting Commissioner of Patents and Trademarks